US006275930B1

(12) United States Patent
Bonamico

(10) Patent No.: US 6,275,930 B1
(45) Date of Patent: Aug. 14, 2001

(54) METHOD, COMPUTER, AND ARTICLE OF MANUFACTURING FOR FAULT TOLERANT BOOTING

(75) Inventor: John Bonamico, Mattituck, NY (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/132,956

(22) Filed: Aug. 12, 1998

(51) Int. Cl.[7] .............................. G06F 11/00; G06F 1/32; G06F 13/14
(52) U.S. Cl. .................................. 713/1; 713/1; 713/323; 710/129
(58) Field of Search ................................... 713/2, 1, 300, 713/323–324; 345/522; 710/129

(56) References Cited

U.S. PATENT DOCUMENTS

| 4,663,707 | * | 5/1987 | Dawson ................................. 364/200 |
| 5,247,659 | * | 9/1993 | Curran et al. ............................. 713/1 |
| 5,410,706 | * | 4/1995 | Farrand et al. ........................... 717/1 |
| 5,564,054 | * | 10/1996 | Bramnick et al. ..................... 295/700 |
| 5,630,049 | * | 5/1997 | Cardoza et al. ........................ 714/25 |
| 5,675,800 | * | 10/1997 | Fisher, Jr. et al. ....................... 717/1 |
| 5,745,669 |   | 4/1998 | Hugard et al. ................... 395/182.01 |
| 5,828,888 | * | 10/1998 | Kozaki et al. ......................... 717/11 |
| 5,974,546 | * | 10/1999 | Anderson ................................. 713/2 |
| 5,987,605 | * | 11/1999 | Hill et al. ................................. 713/2 |
| 6,067,628 | * | 5/2000 | Krithivas et al. ..................... 713/340 |

FOREIGN PATENT DOCUMENTS

| 0 747 819 A1 | 12/1996 | (EP) . |
| 2 294 568 | 5/1996 | (GB) . |
| WO 95/22794 | 8/1995 | (WO) . |

* cited by examiner

Primary Examiner—Thomas Black
Assistant Examiner—Te Yu Chen
(74) Attorney, Agent, or Firm—Fliesler Dubb Meyer & Lovejoy LLP

(57) ABSTRACT

A method and article of manufacture, such as a magnetic disk containing computer instructions, for preventing a device driver from disabling an operating system during boot-up is provided. Fault tolerant booting software is provided in a computer having remote control software. The computer is able to provide video information to another remote computer in response to a user's input. The fault tolerant booting software interfaces with the computer's various device drivers, including, a video driver, keyboard driver, and a pointing device driver. The fault tolerant booting software attaches to identified device drivers to prevent a faulty driver filter from rendering the operating system inoperable for failing to load during a bootstrap routine. The method includes a step of restoring registry information after the fault tolerant booting software attaches the device filters to identified device drivers. Messages are also displayed to identify a faulty device driver.

18 Claims, 6 Drawing Sheets

METHOD, COMPUTER, AND ARTICLE OF MANUFACTURING FOR FAULT TOLERANT BOOTING

BACKGROUND OF THE INVENTION

1. Field of the Invention

The present invention relates to software and, in particular, tolerating faults during the booting of computer software.

2. Background of the Invention

A device driver is a software program that links a peripheral device or internal computer function to the operating system. The device driver contains the precise machine language necessary to activate all device functions and includes detailed knowledge of the device's characteristics, such as the number of keys in a keyboard or the number of pixels of screen resolution of a display. For example, a computer typically includes a keyboard device driver for activating keyboard functions. Device drivers may interface with hardware, the operating system, or other device drivers.

Booting a computer refers to causing a computer to start executing instructions. Generally, computers contain built-in instructions in a read-only-memory (ROM) that are automatically executed at start-up or when the computer is powered on. These set of computer instructions are typically called a bootstrap routine. The bootstrap routine searches for the operating system, loads the operating system and passes control to the operating system. The operating system may search for device drivers and store device driver specific information in predetermined memory locations.

Often, testing and debugging a newly designed device driver is a difficult task. When designing device drivers, as with all software development, bugs or run time errors occur throughout the development process. When an application program has a bug, the worse that can happen is that the operating system must be rebooted (the computer is powered off and back on) to resume operation. Unlike an application program, a bug in a device driver usually crashes the operating system rendering it inoperable and requiring a re-install of the operating system.

There may be many reasons why the device driver caused the operating system to crash. First, the operating system accessing the device driver may have bugs. Second, the device driver may also have bugs causing the operating system to crash.

One method for avoiding an operating system crash involves a manual fix to disable the newly designed device driver. This consists of booting into another operating system and renaming and copying files around on the disk drive. For example, if a computer has multiple operating systems which have access to the same file system which includes the faulty device driver, a user could boot into the operating system which is operable and delete the faulty device driver. While this is faster than re-installing the operating system, it is still a painstaking and time-consuming process. In addition, the user must have a good working knowledge of the operating system and file structure. If a faulty device driver is loaded onto multiple computers in a network, the device driver installed on each computer would have to be deleted. This time spent rebooting the various computers by hand substantially reduces the amount of time available in the software development process required to fix the bug. Likewise, any user of the software containing or using the faulty driver will be unable to use their computer until the operating system is reinstalled and the faulty driver is deleted.

It is therefore desirable to provide a method and article of manufacture, such as a magnetic disk having programmed computer instructions, which enables a computer to withstand an error generated by a faulty device driver and/or faulty operating system. In particular, the method and article of manufacture should prevent the faulty device driver from crashing the operating system. The method and article of manufacture should identify the faulty device driver, disable the device driver and not require time-consuming manual fixes of a single computer or multiple computers on a network.

SUMMARY OF THE INVENTION

A method for preventing a device driver in a computer from causing an operating system to crash during a bootstrap routine is provided. The method includes identifying the device driver in the computer. Registry information associated with the device driver is altered in order for the operating system to initiate an associated filter driver. The filter driver then initiates the device driver. The device driver then may be disabled in response to an error.

According to another aspect of the present invention, the method includes restoring the registry information after the registry information has been altered.

According to still another aspect of the present invention, a name of the disabled device driver is displayed.

According to another-aspect of the present invention, a method for preventing a device driver in a computer from rendering an operating system inoperative includes the step of setting a BootInProgress registry flag. An AutoReboot OS registry state is saved and the AutoReboot OS registry flag is set to "on." A filter driver is then attached to the device driver. The AutoReboot OS registry state is restored, and the BootInProgress registry flag is removed.

According to another aspect of the present invention, the device driver is a video driver, keyboard driver and/or pointing driver.

According to another aspect of the present invention, the operating system is a Windows NT operating system.

According to still another aspect of the present invention, a computer comprising a processor and operating system is provided. The processor is coupled to an operating system stored in memory. A fault tolerant booting software program, which is also stored in memory, prevents a device driver from disabling the operating system during initialization. The fault tolerant booting software program includes a first software module for restoring the initial registry settings. A second software module attaches a filter to the device driver, and a third software module displays a device driver failure message.

According to another aspect of the present invention, the computer further comprises a remote control software program including the fault tolerant booting software, and a remote computer, coupled to the computer, for displaying video in response to user input.

According to still a further aspect of the present invention, an article of manufacture including a computer readable medium having computer readable program code means is provided. The computer readable program code means comprises computer readable program code means for causing a computer to restore an initial registry setting and computer readable program code means for attaching a filter to a device driver. Computer readable program code means is also provided for displaying a device driver failure message.

DETAILED DESCRIPTION

Figure 1A:
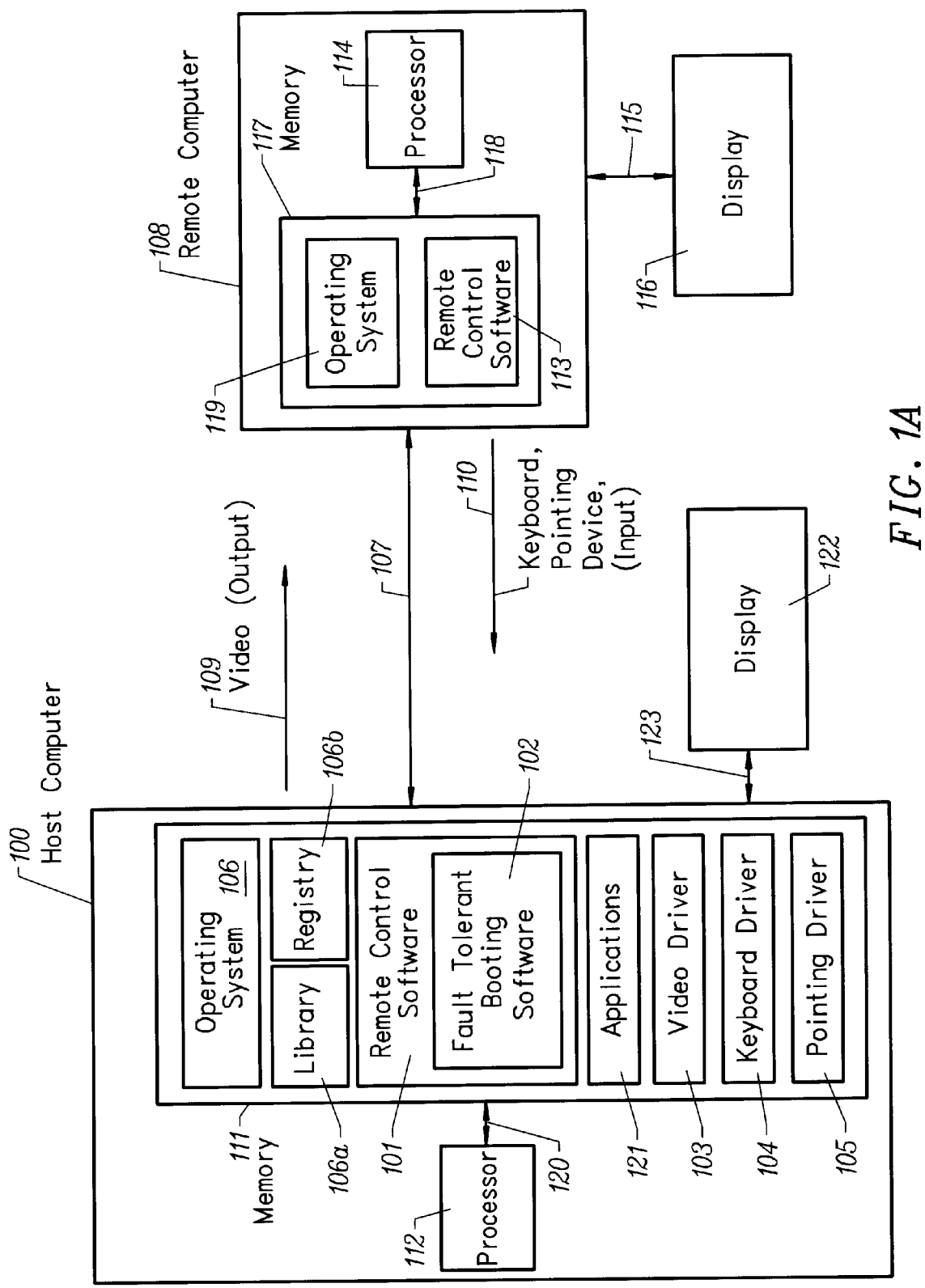
FIG. 1A illustrates a simplified computer hardware and software block diagram according to the present invention.
Figure 1B:
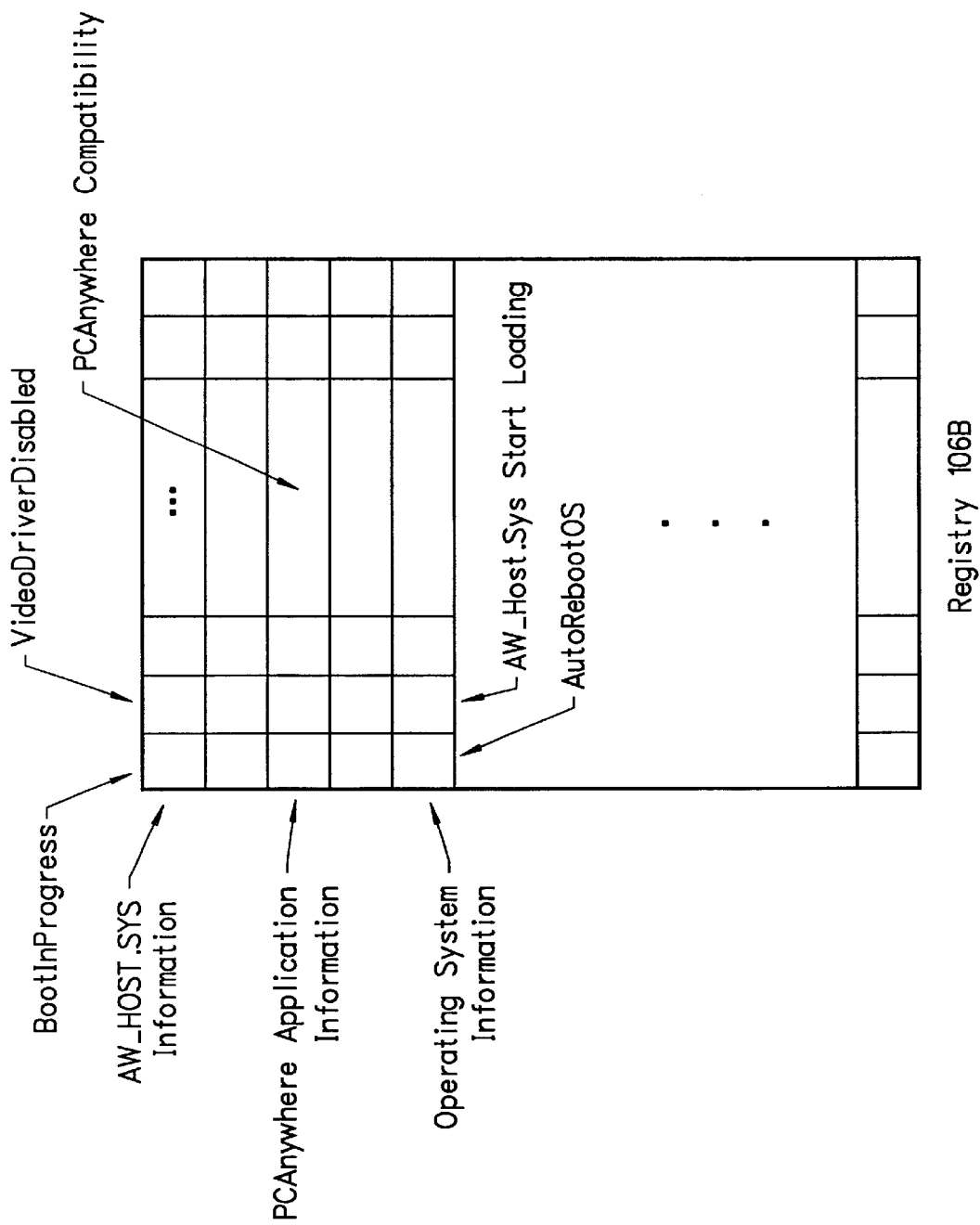
FIG. 1B illustrates the registry illustrated in FIG. 1A according to the present invention.

FIG. 1A illustrates a simplified computer hardware and software block diagram according to the present invention. Host computer 100 includes operating system 106. Operating system 106 as well as other software is stored in memory 111. Memory 111 may be a single type of memory or a variety of types, such as ROM, random-access-memory (RAM), electrically erasable programmable read only memory (EEPROM), magneticloptical disk drive or equivalent type of memory. Processor 112 accesses memory 111 by bus 120 in order to control the operation of host computer 100. In an embodiment, host computer 100 is a Pentium-based computer. Host computer 100 is coupled to display 122 by bus 123. Display 122 is provided to display information to users. Host computer 100 may be coupled to other computers by a local area network (LAN), wide area network (WAN), or other equivalent type of network. In an embodiment, operating system 106 is Windows NT 4.0 supplied by Microsoft Corporation of Redmond, Wash. Operating system 106 may be a Windows 9x operating system or equivalent operating system. Operating system 106 accesses libraries 106a and registry 106b. An embodiment of registry 106b is illustrated in FIG. 1B.

Host computer 100 also includes remote control software 101. In an embodiment, remote control software 101 is pcANYWHERE 8.0 supplied by Symantec Corporation of Cupertino, Calif. Remote control software 101 includes fault tolerant booting software 102. In an alternate embodiment, fault tolerant software 102 may not be included in remote control software 101 and may be a separate software module or set of computer instructions. Remote control software 101 interfaces with operating system 106 as well as library 106a and Registry 106b. Host computer 100 also includes a variety of device drivers. For clarity, exemplary device drivers 103, 104, and 105 are shown. It should be understood by one of ordinary skill in the art that many other device drivers may be included in a particular embodiment of host computer 100. In particular, video driver 103, keyboard driver 104, and pointing device (mouse) driver 105 interact with remote control software 101, and in particular, fault tolerant booting software 102 as described below. Applications 121, such as a word processing program, are also resident in memory 111 of host computer 100.

Host computer 100 is coupled to remote computer 108 by connection 107. In an embodiment, connection 107 may be by way of modem ("TAPI"), Integrated Services Digital Network ("ISDN"), Transmission Control Protocol/Internet Protocol ("TCP/IP"), Internet Packet Exchange ("IPX"), Sequenced Packet Exchange ("SPX"), Banyon Vines, infrared, direct serial, and direct parallel. One of ordinary skill in the art would understand the necessary hardware to form a remote connection between host computer 100 and remote computer 108.

Remote computer 108 also includes memory 117 which is coupled to a processor 114 by bus 118. Memory 117 may be a single type of memory or a variety of types, such as ROM, RAM, EEPROM, magnetic/optical disk drive or an equivalent type of memory. Remote computer 108 is also coupled to a display 116 by bus 115. Operating system 119 is stored in memory 117 for controlling the operation of remote computer 108. Remote computer 108 also includes remote control software 113, stored in memory 117, which allows a user to control host computer 100. In particular, host computer 100 sends video output 109 to remote computer 108 in response to remote computer 108 sending keyboard and pointing device input data 110 to host computer 100. Likewise, applications 121 are executed on host computer 100 with corresponding data (video 109) generated on connection 107 to remote computer 108.

Video output 109 is the most difficult information to send to remote computer 108 because of the size of data transferred. Various methods used for trapping the video output 109 offers different advantages. In order to obtain high performance, remote control software 101 traps video output at the device driver level. AW_HOST.SYS driver 220 essentially wraps or attaches a video filter driver, such as video drive filter 220a shown in FIG. 2, to video driver 103. Likewise, remote control software 101 interfaces with keyboard driver 104 and pointing device driver 105.

A driver filter is a layer of code or set of computer instructions used as an interface between the operating system 106 and an associated device driver. In an embodiment, a driver filter is generally loaded before the associated device driver and identifies which device drivers are present on the computer. The driver filter attaches or hooks to the device driver by altering information in the registry 106b such that operating system 106 loads the associated driver filter during the bootstrap routine instead of the associated device driver. The operating system calls the driver filter which executes an initialization routine. The driver filter then initializes the associated device driver and passes information from operating system 106 to the device driver. Among other functions, the driver filter is responsible for passing information between operating system 106 and the associated device driver and acts as a bidirectional filter. For example, if the device driver fails and generates a failure message (or code), the filter driver receives the driver failure message and will then notify the operating system 106 which may generate a message to the filter driver.

Figure 2:
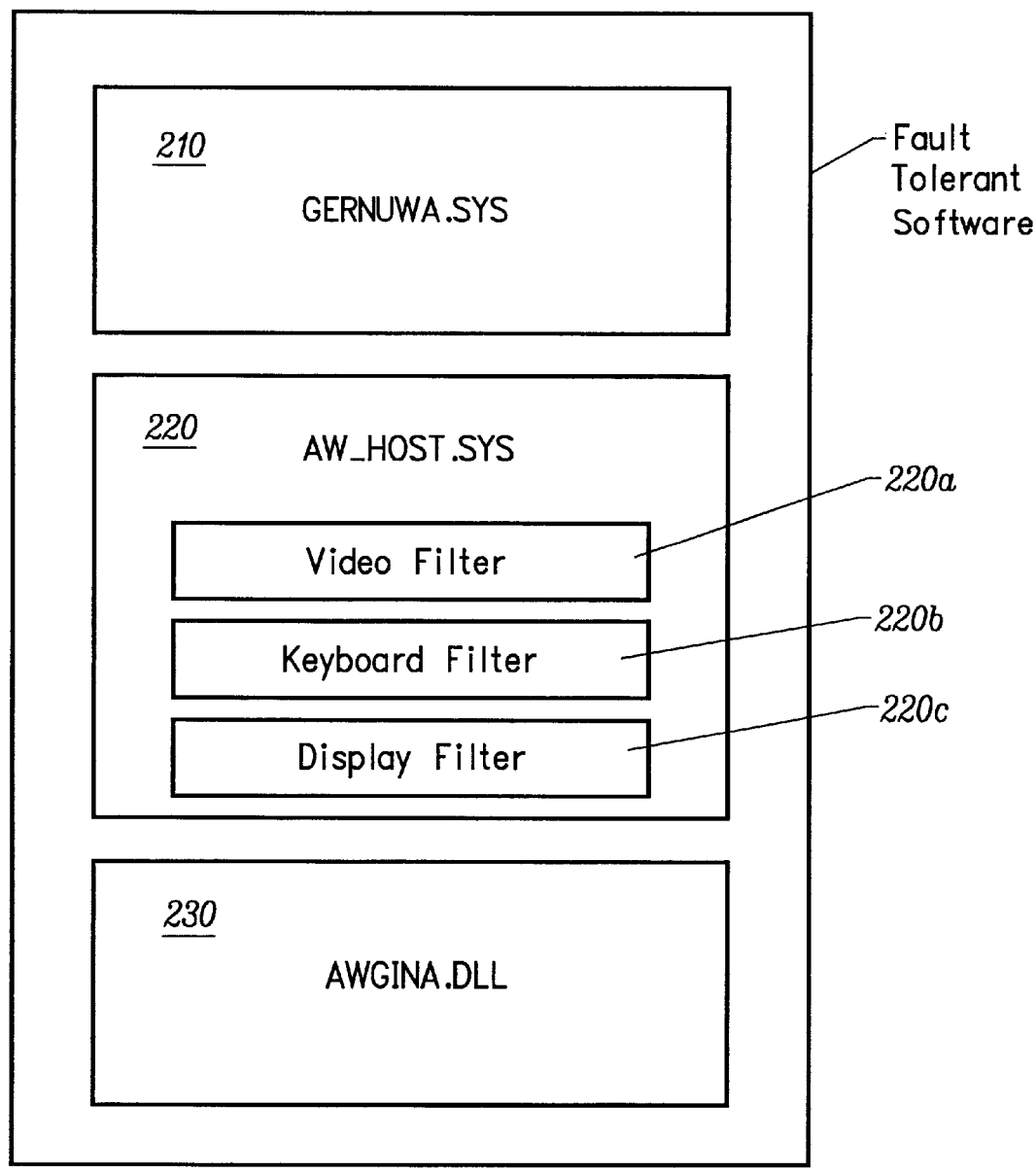
FIG. 2 illustrates software modules of the fault tolerant booting software illustrated in FIG. 1A according to the present invention.

FIG. 2 illustrates the three main software modules for fault tolerant booting software 102 illustrated in FIG. 1. The first software module is GERNUWA.SYS driver 210 which loads at the earliest possible time that operating system 106 allows. GERNUWA.SYS driver 210 undoes all the registry 106b changes that AW_HOST.SYS driver 220 made during the last time that operating system 106 booted. AW_HOST.SYS driver 102 includes software instructions for identifying device drivers in a computer and attaching a bidirectional filter driver to the identified device drivers. In an embodiment, AW_HOST.SYS driver 220 includes video filter 220a, keyboard filter 220b, and display filter 220c. In an embodiment, GERNUWA.SYS driver 210 is loaded first by the operating system 106 and AW_HOST.SYS driver 220 is loaded second with AWGINA.DLL 230 loaded third. It should be noted software modules 210, 220, and 230 may not necessarily be loaded consecutively by operating system 106.

The naming convention of the software modules is significant. The "GERNUWA.SYS" name is based on spelling "awunreg" backwards. Typically, pcANYWHERE software modules beginning with "aw" which stands for "anywhere" and the "unreg" refers to undo registry. The name is spelled backwards so users will not improperly delete the GERNUWA.SYS driver 210 before the module can make the necessary undo registry changes. Often, users without the proper deinstall software, will improperly delete all "aw" files in order to remove the pcANYWHERE software.

In an embodiment, the GERNUWA.SYS driver 210, AW_HOST.SYS driver 220, and AWGINA.DLL library may be combined into a single driver. In another embodiment, the GERNUWA.SYS driver 210, AW_HOST.SYS driver 220, and AWGINA.DLL library are written in C computer language.

The next device driver to be loaded by operating system 106 is the main or master fault tolerant booting device driver, AW_HOST.SYS driver 220. The device driver 220 is responsible for attaching to various devices, such as video, keyboard and pointing device (mouse). in an embodiment, the majority of the fault tolerant booting code resides in AW_HOST.SYS driver 220.

The main purpose of AWGINA.DLL library 230 is for trapping the operating system security subsystem. AWGINA.DLL library 230 is a multifunction library. One function of AWGINA.DLL library 230 includes displaying messages from fault tolerant booting software 102.

While remote control software 101 and fault tolerant booting software 102 are illustrated in memory 111 of host computer 100, software 101 and/or software 102 may be stored in an article of manufacturing including a magnetic or optical disk or diskette or equivalent thereof. Remote control software 101 and/or fault tolerant booting software 102 may also be downloaded via the Internet or world wide web ("www").

Figure 3:
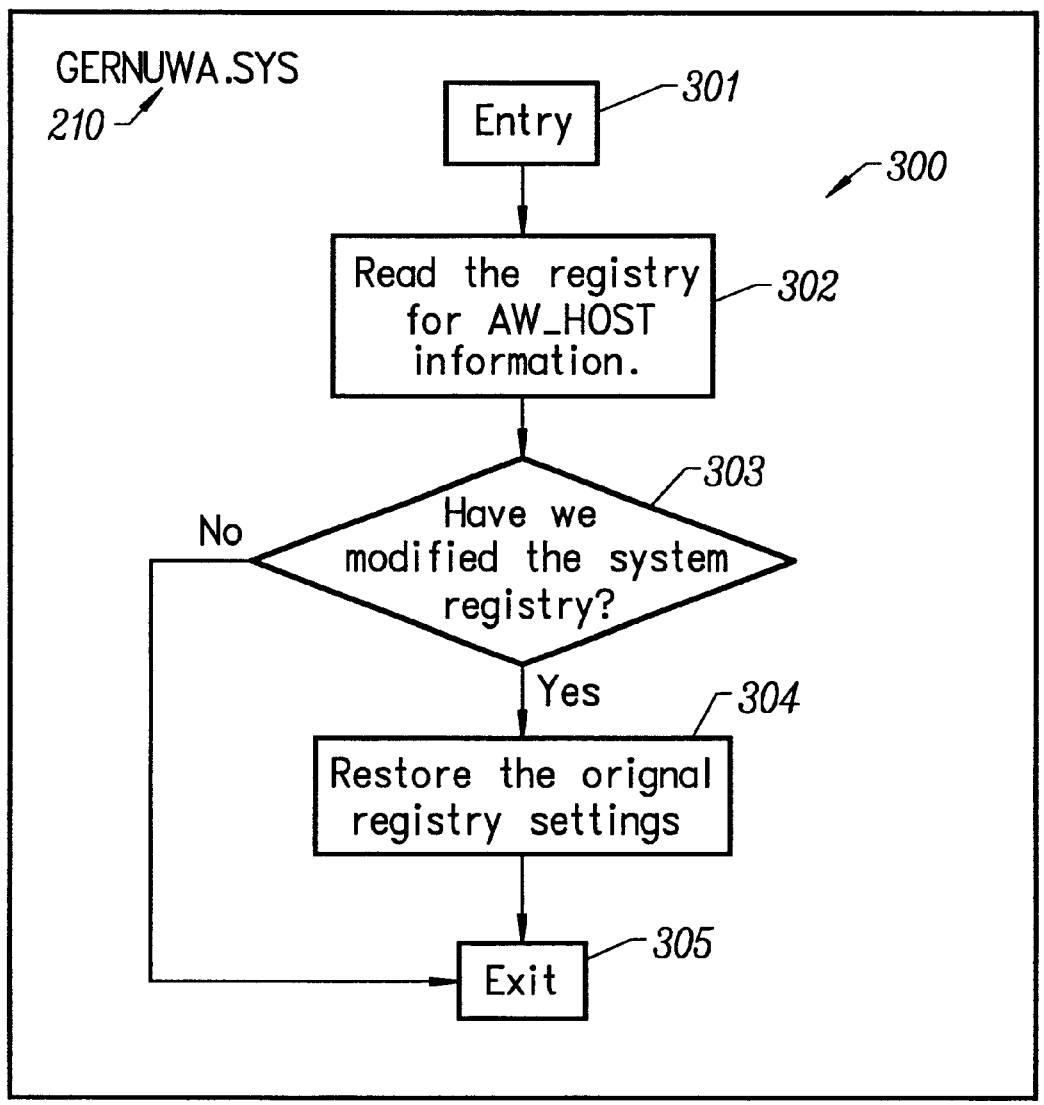
FIG. 3 illustrates a control flow diagram of the GERNUWA.SYS software module as illustrated in FIG. 2 according to the present invention.

FIG. 3 illustrates a logic flow diagram 300 for GERNUWA.SYS driver 210 as illustrated in FIG. 2. As described above, GERNUWA.SYS driver 210 undoes all the registry modifications to registry 106b that were made by AW_HOST.SYS driver 220 during the last time that the operating system 106 was booted or the last time the bootstrap routine was executed. After entry into logic block 301, GERNUWA.SYS driver 210 reads registry 106b for AW_HOST.SYS information which includes information copied from the operating system information portion of registry 106b as illustrated in FIG. 1B. A decision is then made as to whether registry 106b has been modified in logic block 303. If registry 106b has been modified, the original values are restored in logic block 304. Otherwise, the GERNUWA.SYS driver 210 transfers control to logic block 305 and exits. After restoring the original registry 106b values in logic block 304, control is also passed to logic block 305 and GERNUWA.SYS driver 210 exits.

Figure 4:
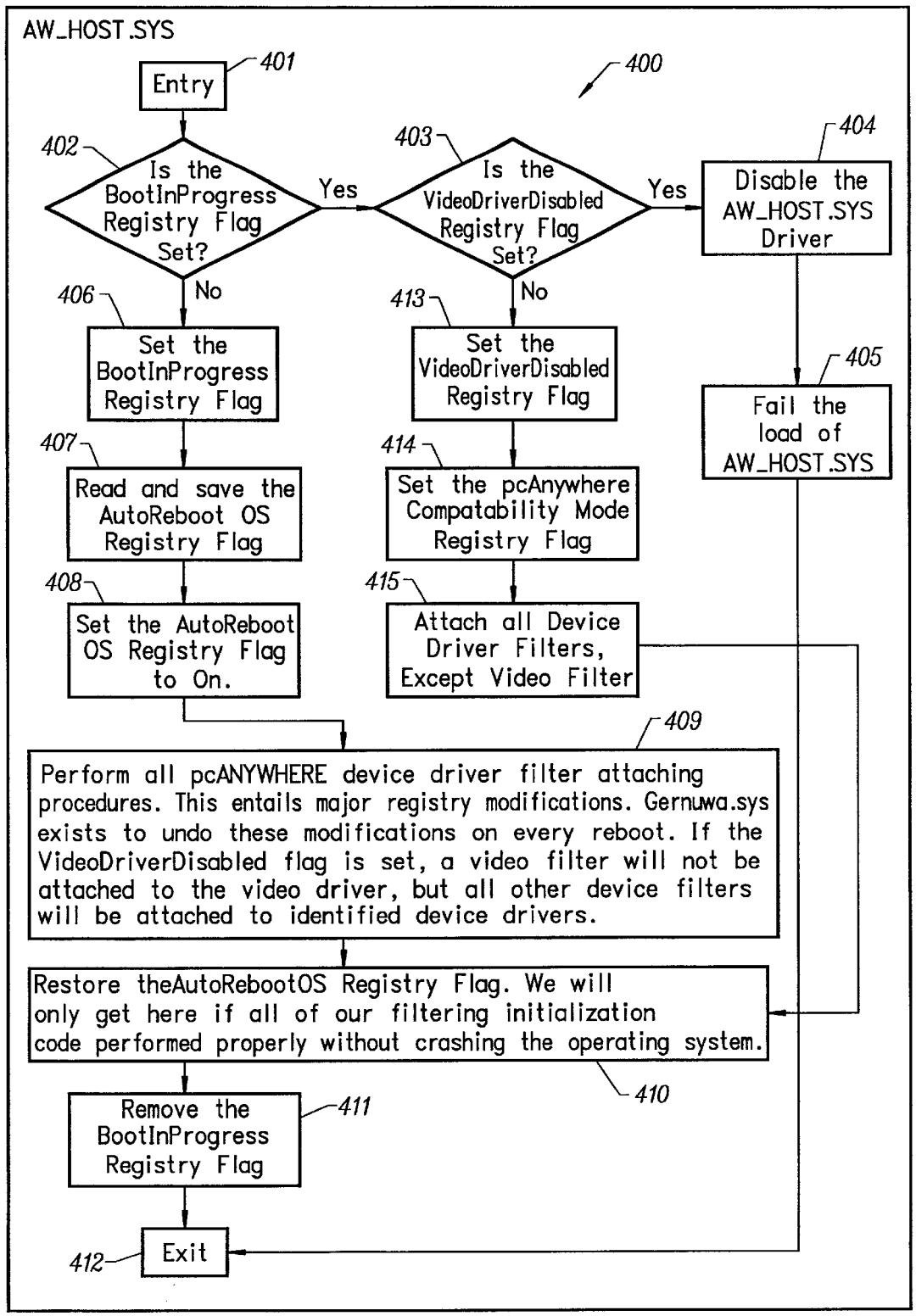
FIG. 4 illustrates a control flow diagram of the AW_HOST.SYS software module as illustrated in FIG. 2 according to the present invention.

FIG. 4 illustrates a logic flow diagram 400 for AW_HOST.SYS driver 220 as illustrated in FIG. 2. AW_HOST.SYS driver 220 is the main driver and is responsible for attaching a bidirectional device filter to an identified device driver. For example, AW_HOST.SYS driver 220 may attach a video filter, keyboard filter, and/or pointer filter to a video driver, keyboard driver and/or pointer (mouse) driver, respectively. After entering AW_HOST.SYS in logic block 401, a decision is made in logic block 402 whether BootInProgress registry flag is set. The BootInProgress memory location, as well as other AW_HOST.SYS information, is located in registry 106b as illustrated in FIG. 1B.

FIG. 1B is provided to illustrate the various logical memory locations in registry 106b and may not represent actual physical memory locations of information. Registry 106b includes, but is not limited to, AW_HOST.SYS information, pcANYWHERE application information and operating system information. A memory location in registry 106b may be flagged (set) or toggled to a one value or zero value depending upon the particular application. The value of a particular memory location is considered its state.

If the BootInProgress flag is set (or a one value is stored in the BootInProgress memory location), control is transferred to logic block 403; otherwise, logic is passed to logic block 406. A determination is made in logic block 403 whether VideoDriverDisabled registry flag is set. If the VideoDriverDisabled registry flag is set, control is passed to logic block 404 in which the AW_HOST.SYS driver is disabled by setting the AW_HOST.SYS Start Loading memory location in registry 106b to a "manual start" value instead of "system start" value. Otherwise, the VideoDriverDisabled registry flag is set in logic block 413. If the AW_HOST.SYS driver is disabled in logic block 404, control is passed to logic block 405 where it is noted that the AW_HOST.SYS failed to load. Control from logic block 405 is passed to logic block 412 where AW_HOST.SYS driver 220 exits.

Control from logic block 413 is passed to logic block 414. The pcANYWHERE compatibility mode registry flag is set in logic block 414. In logic block 415, all filters except the video driver is attached to respective device drivers. Control is then passed to logic block 410.

After the BootInProgress registry flag is set in logic block 406, control is transferred to logic block 407 where the AutoReboot OS registry flag is read and saved. The AutoReboot OS registry flag is then set to "on" or a one value is stored in the AutoReboot OS memory location in logic block 408. Control is then transferred to logic block 409 where resident device drivers are identified and device driver filters are attached to respective device drivers. A large amount of registry information in registry 106b is altered by code represented by logic block 409. On every reboot, as described above, GERNUWA.SYS driver 210 undoes these alterations to registry 106b. If a device driver disable flag is set, AW_HOST.SYS does not attach to the corresponding device driver, but will attach respective filters to the other remaining identified device drivers. For example, if the VideoDriverDisabled flag is set, AW_HOST.SYS driver 220 will not attach video filter 220a to video driver 103, but will attach keyboard filter 220b and pointer filter 220c to keyboard driver 104 and pointing driver 105, respectively. Logic block 409 is the point in which the computer will crash if an incompatibility with a device, for example a video card, or an internal bug occurs. If this happens, the computer will AutoReboot itself and flow chart 400 will be followed as the operating system 106 loads AW_HOST.SYS driver 220.

From logic block 409, control passes to logic block 410 where the AutoReboot OS registry flag is restored. It should be noted that logic block 410 will only be executed if the attaching of device filters and initialization code in logic block 409 is performed properly without crashing operating system 106. Control is then passed to logic block 411 where the BootInProgress registry flag is removed, and control is passed to logic block 412 where AW_HOST.SYS driver 220 exits.

FIG. 1B and FIGS. 3–5 illustrated an embodiment of the present invention in which a video filter is attached to a video driver. The attaching of a video filter to a video driver embodiment is provided for illustration. One of ordinary skill in the art would understand other device drivers, such as keyboard drivers, pointer drivers, or other internal drivers may likewise be implemented within the scope of the present invention. Similarly, the sequence of attaching the device filters may be altered and still be within the scope of the present invention. While FIG. 4 illustrates disabling a filter driver, such as AW_HOST.SYS driver 220, after a crash, other embodiments of the present invention include disabling a device driver.

Figure 5:
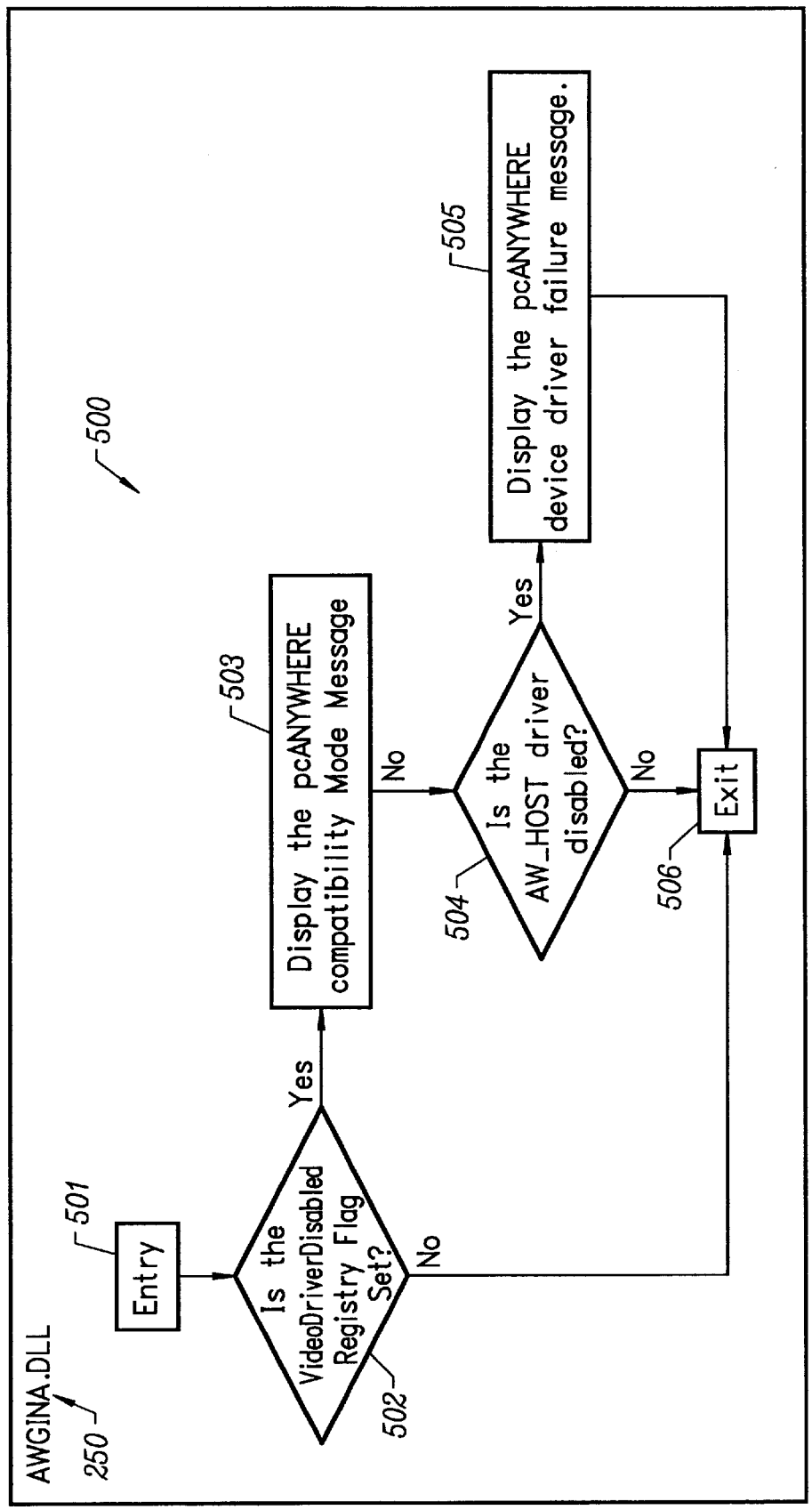
FIG. 5. illustrates a control flow diagram of the AWGINA.DLL software module as illustrated in FIG. 2 according to the present invention.

FIG. 5 illustrates control flow chart 500 for AWGINA.DLL library 230 illustrated in FIG. 2. After entry is made in logic block 501, a determination is made whether VideoDriverDisabled registry flag is set in logic block 502. If the VideoDriverDisabled registry flag is set, logic is passed to logic block 503 where the pcANYWHERE compatibility mode message is displayed. In an embodiment, the message is displayed on display 122. If the VideoDriverDisabled registry flag is not set, logic is passed to logic block 506 where AWGINA.DLL exits the execution thread illustrated in FIG. 5 and completes other AWGINA.DLL functions.

Logic is passed from logic block 503 to logic block 504 where a determination is made whether AW_HOST.SYS driver 220 is disabled. If the AW_HOST.SYS driver is disabled, logic is passed to logic block 505. Otherwise, logic is passed to logic block 506 where AWGINA.DLL continues to complete other functions. In logic block 505, the pcANYWHERE device driver failure message identifying the name of the faulty device driver filter is displayed on display 122.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for preventing a device driver in a computer from rendering an operating system inoperative comprising the steps of:

(a) identifying the device driver in the computer;
    (b) altering registry information associated with the device driver in order for the operating system to initiate an associated filter driver;
    (c) initiating the device driver by the filter driver; and,
    (d) disabling the device driver in response to an error.

2. The method of claim 1, wherein the device driver is a video driver.

3. The method of claim 1, further comprising the steps of restoring the registry information.

4. The method of claim 1, further comprising the step of displaying the name of a disabled device driver filter.

5. The method of claim 1, wherein the disabling the device driver includes disabling the filter driver in response to an error.

6. The method of claim 1, wherein the operating system is a Windows NT operating system.

7. A method for preventing a device driver in a computer from rendering an operating system inoperative, wherein the computer initiates a registry, comprising the steps of:

(a) setting a BootInProgress registry flag;
    (b) saving an AutoReboot OS registry state;
    (c) setting an AutoReboot OS registry flag;
    (d) attaching a filter driver to the device driver;
    (e) restoring the AutoReboot OS registry state; and,
    (f) removing the BootInProgress registry flag.

8. The method of claim 7, further comprising the steps of restoring any previously altered information in the registry before proceeding with the steps (a–f) in claim 7.

9. The method of claim 8, comprising the steps of displaying a device driver failure message.

10. The method of claim 7, wherein the device driver is a video driver.

11. The method of claim 7, wherein the device driver is a keyboard driver.

12. The method of claim 7, wherein the device driver is a pointing driver.

13. A computer, comprising:

a processor;
    an operating system, coupled to the processor, stored in a memory;
    a registry stored in the memory;
    a device driver; and,
    a fault tolerant booting software program, stored in memory, for preventing the device driver from disabling the operating system during initialization;
        wherein the fault tolerant booting software program includes:
            a first software module for restoring an initial setting of the registry;
            a second software module for attaching a filter to the device driver; and,
            a third software module for displaying a device driver failure message.

14. The computer of claim 13, wherein the operating system is a Windows NT operating system.

15. The computer of claim 13, further comprising a video adapter and wherein the device driver is a video driver.

16. The computer of claim 13, wherein the computer is coupled to a display for displaying a device driver message.

17. A computer, comprising:

a processor;
    an operating system, coupled to the processor, stored in a memory;
    a registry stored in the memory;
    a device driver;
    a fault tolerant booting software program, stored in memory, for preventing the device driver from disabling the operating system during initialization by using a filter;
    a remote control software program including the fault tolerant booting software; and,
    a remote computer, coupled to the computer, for displaying video at the remote computer in response to user input at the remote computer.

18. An article of manufacture including a computer readable medium having computer readable program code embodied therein for preventing a device driver in a computer from rendering an operating system inoperative, the computer readable program code means in the article of manufacture comprising:

computer readable program code for causing a computer to restore an initial registry setting;
    computer readable program code for attaching a filter to a device driver; and,
    computer readable program code for displaying a device driver failure message.

* * * * *